June 30, 1970 R. W. ORLOMOSKI 3,517,717
SELF-LOCKING SCREWS
Filed May 3, 1968 8 Sheets-Sheet 1
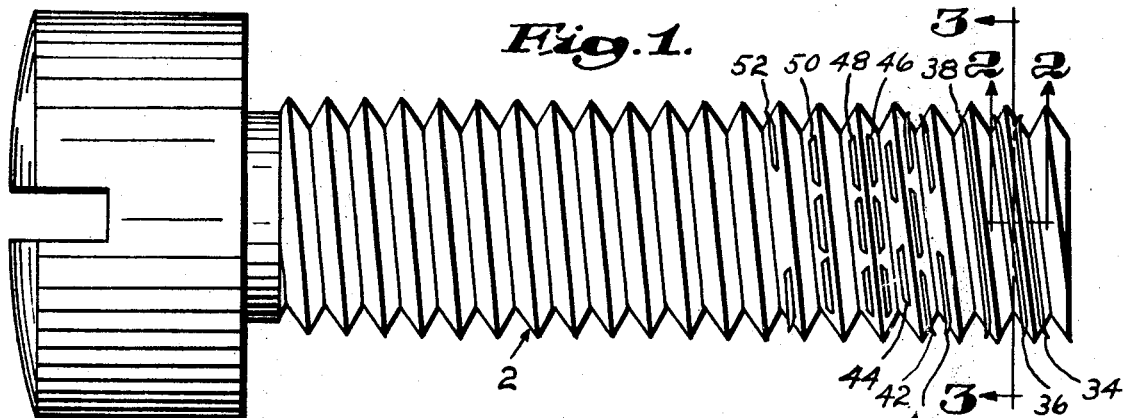
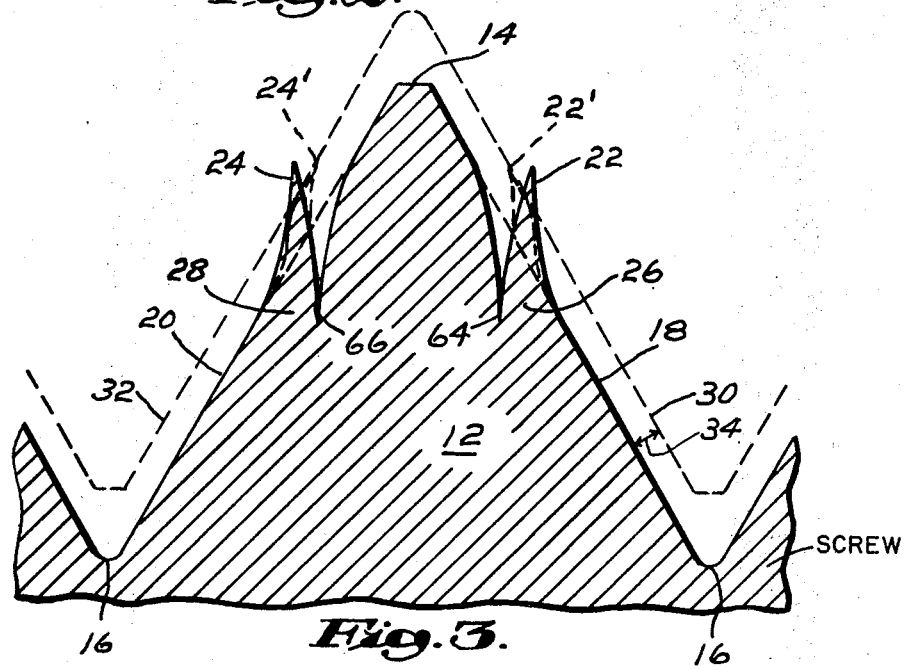
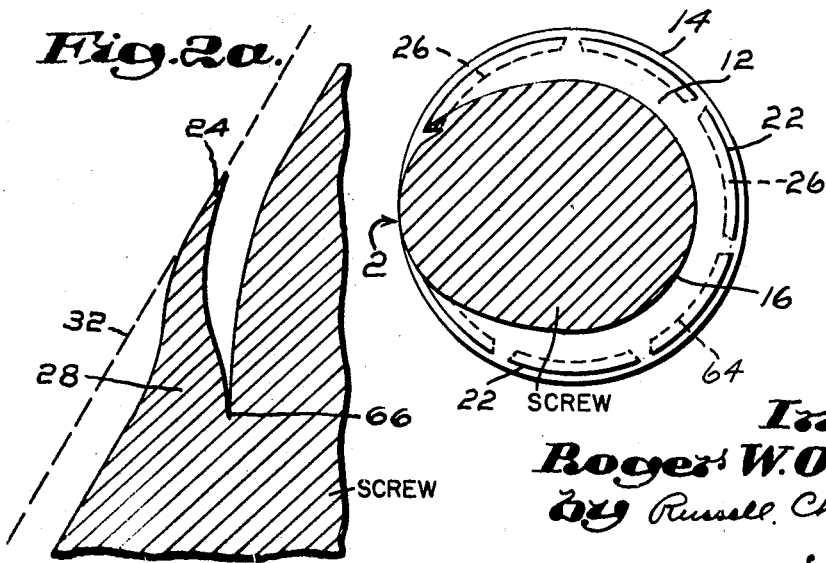
Inventor:
Roger W. Orlomoski,
by Russell, Chittick & Pfund
Attorneys June 30, 1970 R. W. ORLOMOSKI 3,517,717
SELF-LOCKING SCREWS
Filed May 3, 1968 8 Sheets-Sheet 2
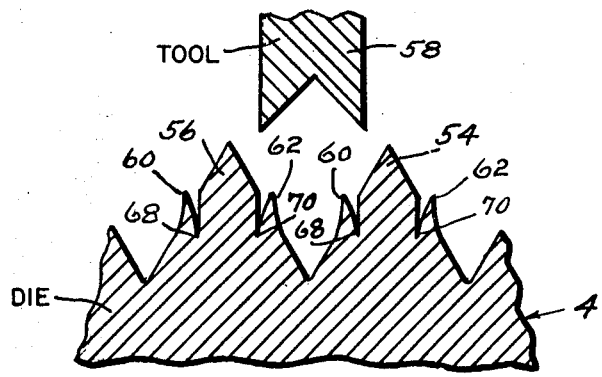
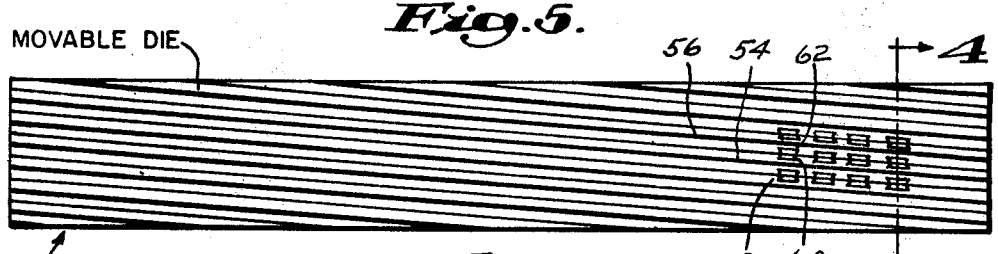
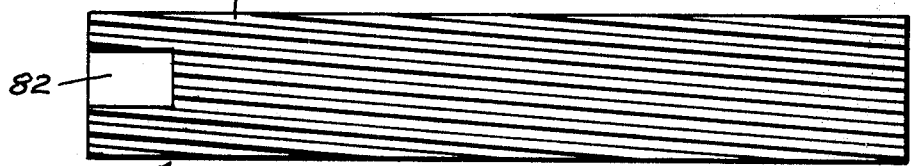
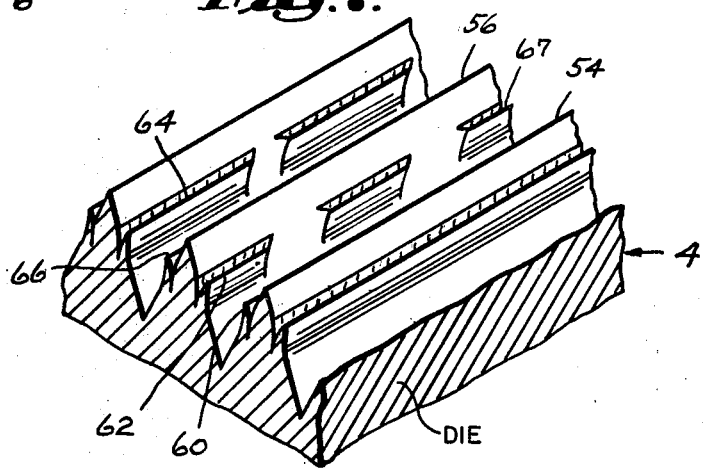
Inventor:
Roger W. Orlomoski,
by Russell, Chittick & Pfund
Attorneys

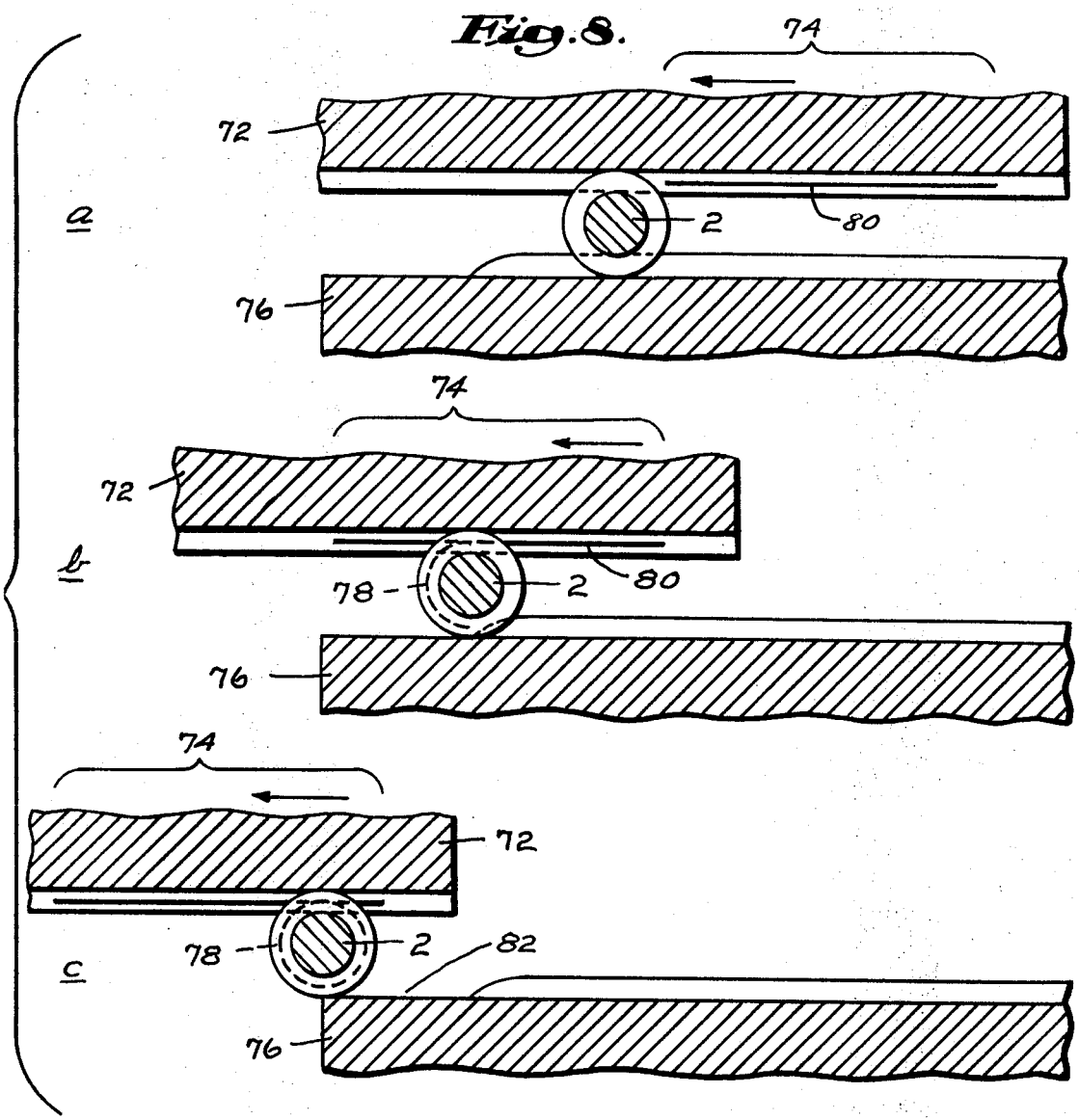

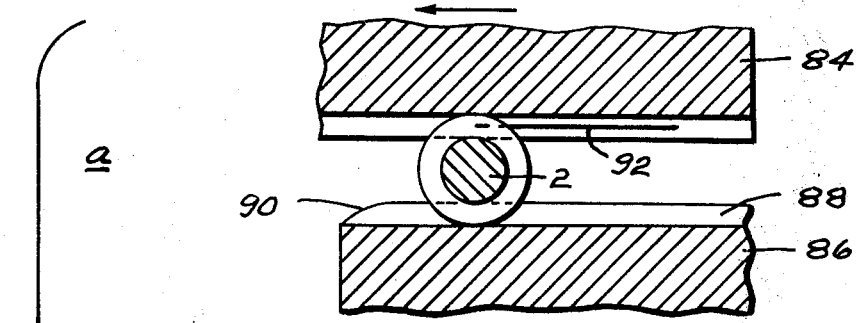
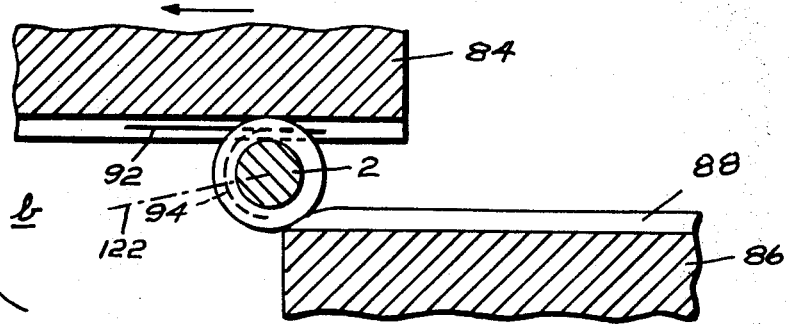
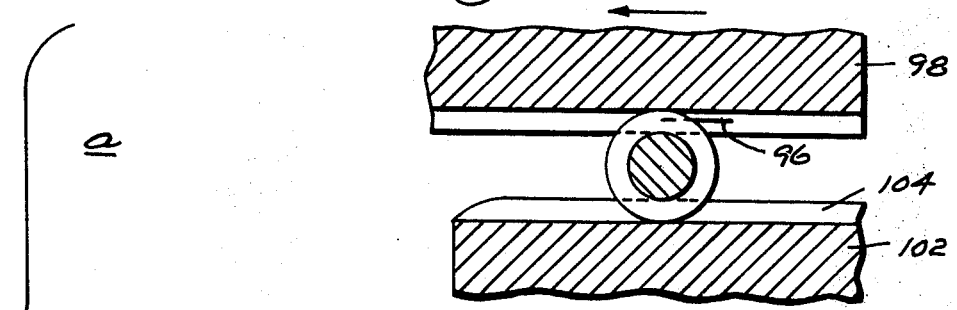
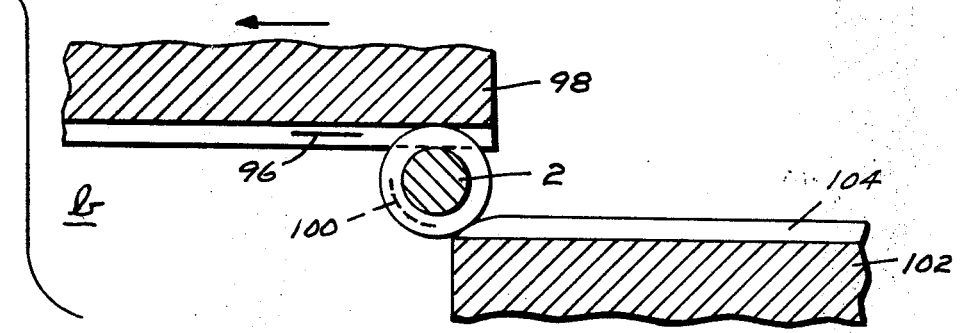

June 30, 1970  R. W. ORLOMOSKI  3,517,717
SELF-LOCKING SCREWS
Filed May 3, 1968  8 Sheets-Sheet 5
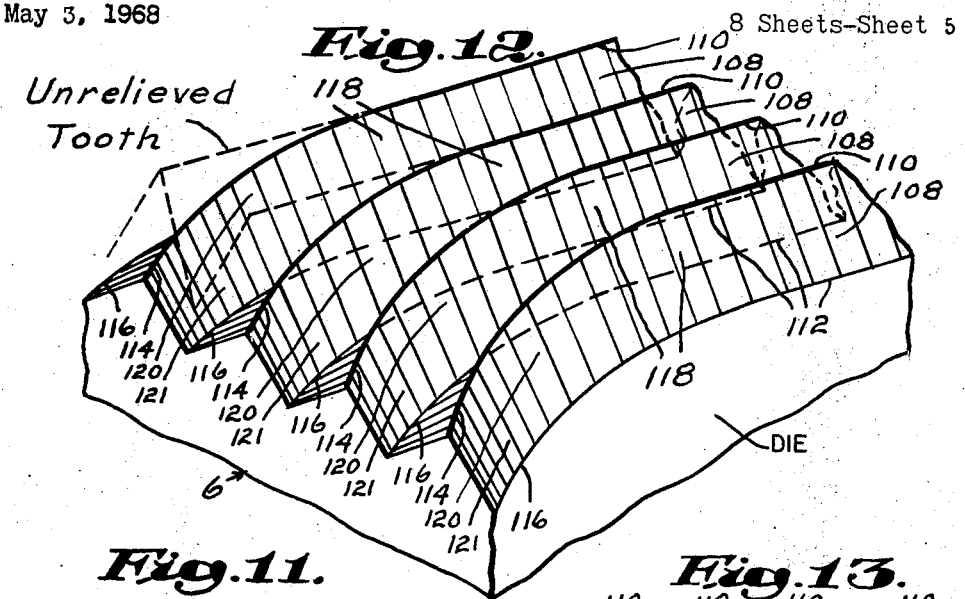
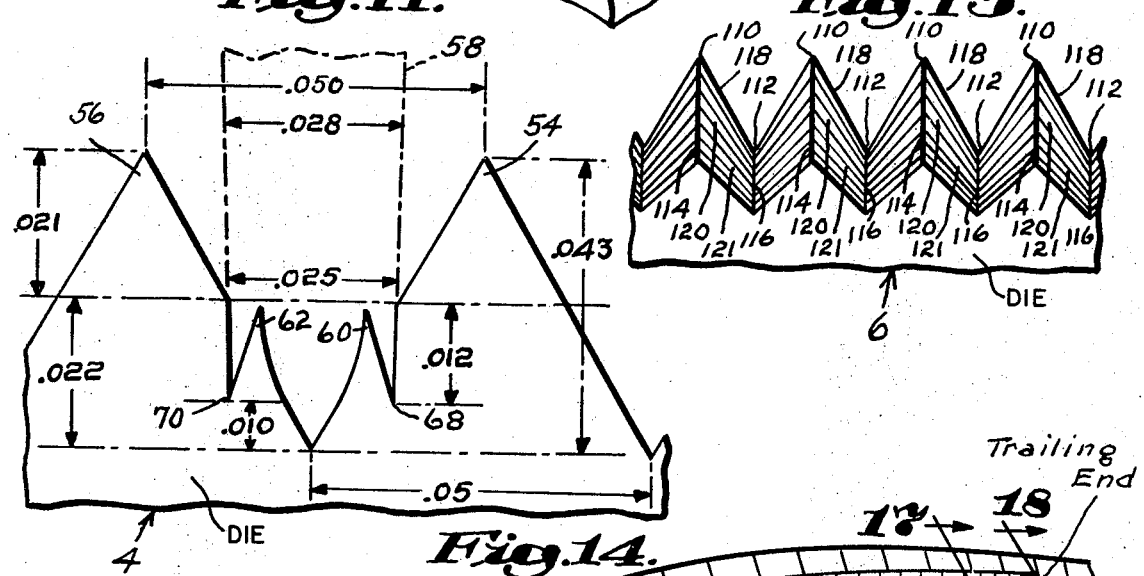
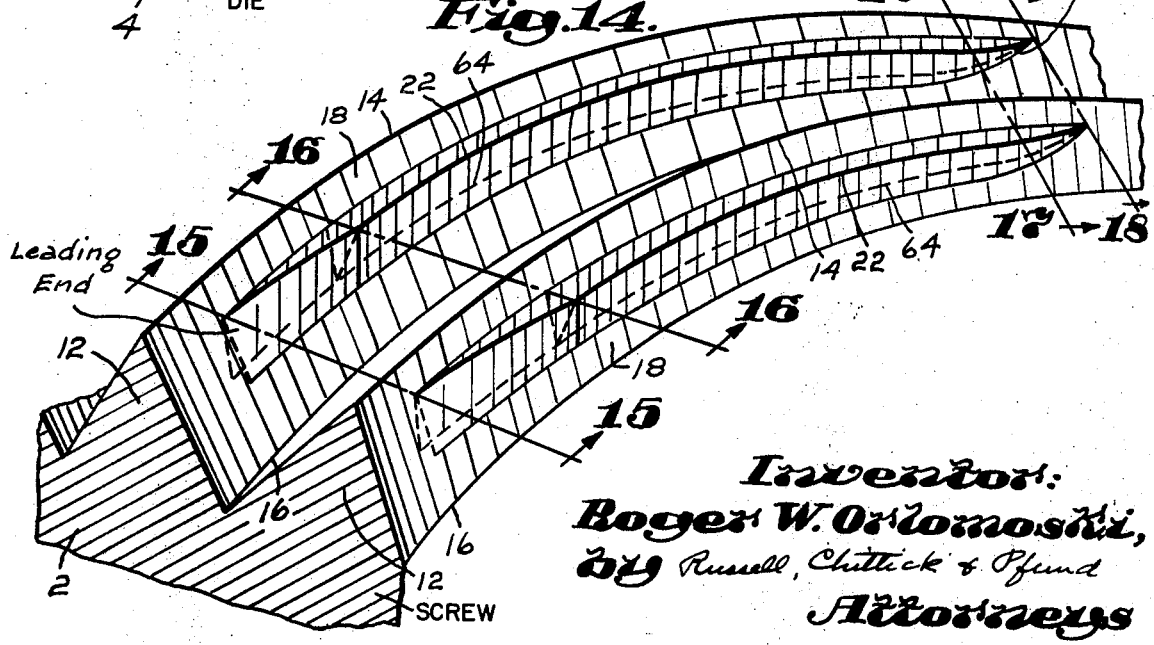
Inventor:
Roger W. Orlomoski,
By Russell, Chittick & Pfund
Attorneys

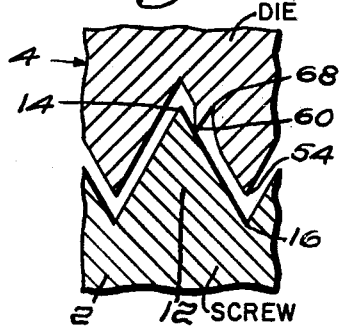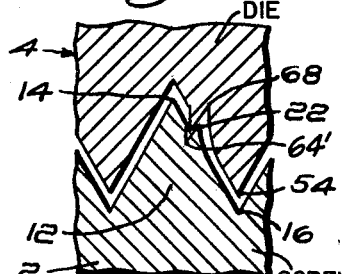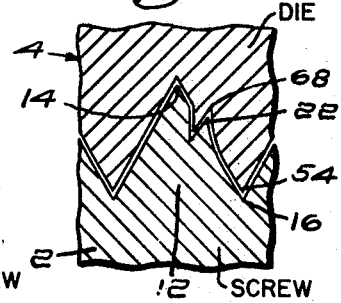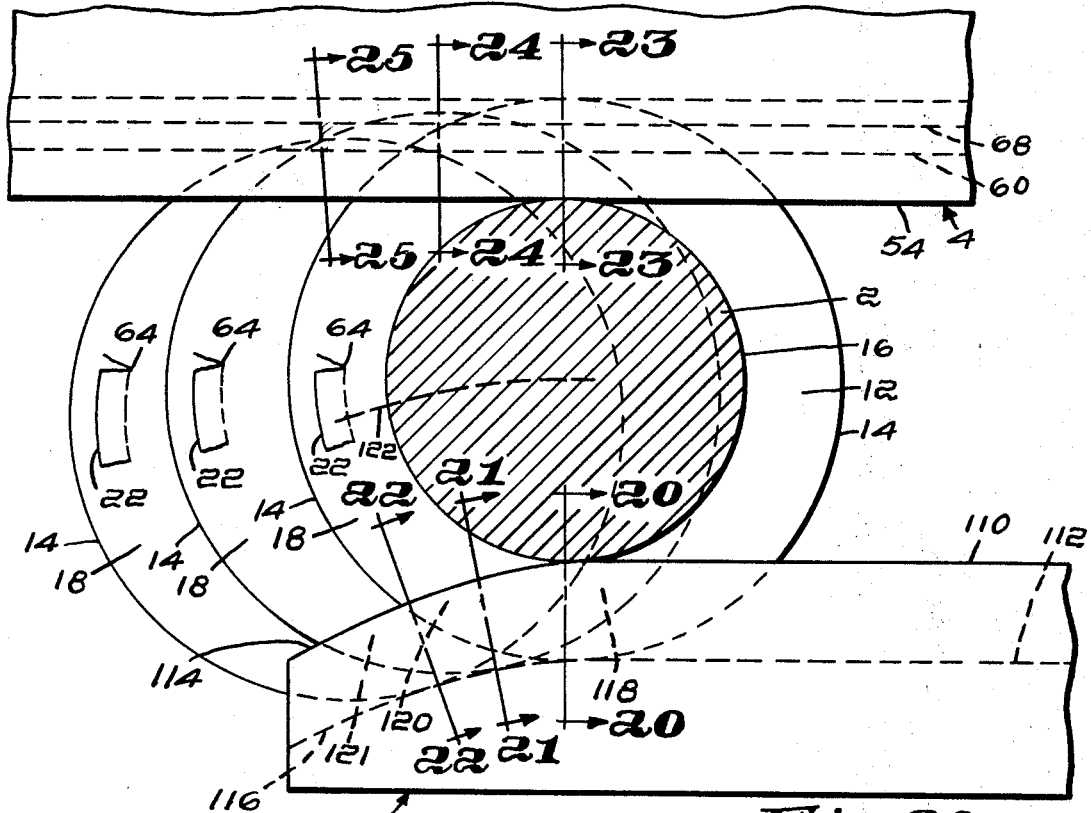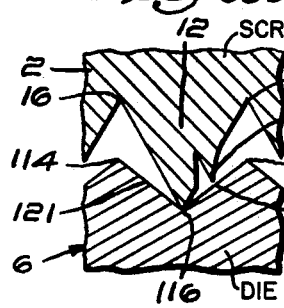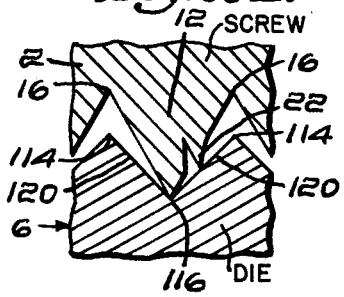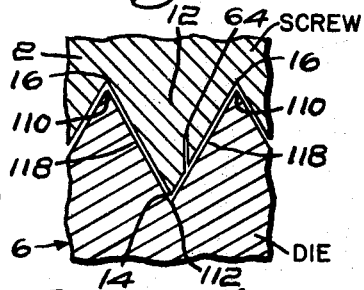

June 30, 1970 — R. W. ORLOMOSKI — 3,517,717
SELF-LOCKING SCREWS
Filed May 3, 1968 — 8 Sheets-Sheet 8

Inventor:
Roger W. Orlomoski,
by Russell, Chittick & Pfund
Attorneys

United States Patent Office 3,517,717
Patented June 30, 1970

3,517,717
SELF-LOCKING SCREWS
Roger W. Orlomoski, Paxton, Mass., assignor to Reed Rolled Thread Die Co., Holden, Mass., a corporation of Massachusetts
Continuation-in-part of application Ser. No. 701,944, Jan. 31, 1968. This application May 3, 1968, Ser. No. 734,833
Int. Cl. F16b 39/30
U.S. Cl. 151—22                         25 Claims

ABSTRACT OF THE DISCLOSURE

Self-locking screws wherein the self-locking result is achieved by forming one or more outwardly turned ribs, continuous or discontinuous, in the flank or flanks of one or more turns of the threads over a selected length of the screw. The screw threads and ribs therein may be made by the use of conventional thread rolling dies (flat or circular) in which certain selected threads in one of the dies (preferably the movable die), over a suitable length have been deformed in a particular manner. The deformed die threads must be located at a proper distance from the end of the die so that the self-locking ribs formed in the threads of the screw will not be subsequently wiped out by encounter with the undeformed threads in the other die. Preferably, however, the ribs should have the leading and trailing ends thereof faired back into the flank of the screw thread sufficiently to facilitate entry into and removal from the internal thread.

CROSS REFERENCE TO RELATED APPLICATIONS

This application is a continuation-in-part of copending application Ser. No. 701,944, now abandoned.

BACKGROUND OF THE INVENTION

The need for screws which will be self-locking when screwed into correspondingly threaded nuts or apertures is self-evident and much has been done heretofore to achieve this result. In fact, the Locking Fastener Section of the Industrial Fasteners Institute has established specifications for the locking characteristics of prevailing-torque type locking screws. The standards generally contemplate that a self-locking screw of given size when screwed into a nut of correct size will require no more than an established amount of torque measured in inch-pounds to make the initial installation. This requirement is coupled with a minimum breakaway torque for the same screw after it has been removed, reinserted and removed four additional times. That is, the torque required to achieve the fifth removal must not be less than the established standard.

The prior art is fairly extensive in this field with the most common form of self-locking structure being of the type which embodies in or between the threads some kind of yieldable non-metallic material that has been secured to the threaded structure by a secondary operation. Other types are in the general class of deformed threads or mis-matched threads, which create increased friction between the threads of the screw and the corresponding internal threads of the nut.

SUMMARY

In summary, the present invention contemplates that the flank or flanks of the thread of the screw for a selected number of turns be formed in a novel manner in which a portion of the body of the thread is wedged outwardly by special formations in one of the thread rolling dies to produce one or more ribs extending either continuously or intermittently around one or both of the flanks of the thread of the screw and the outer edge of the rib is intermediate the crest and root. In some instances, however, it may be considered desirable to have the rib well up on the screw flank to engage against the corresponding flank of the nut thread closer to the nut thread root. When this construction is made, the edges of the ribs may extend to a radius the same as or even greater than the radius of the screw crest, but the ribs are still defined as being intermediate (between) the root and crest of the screw thread.

In still other modifications, the die may be designed to produce the ribs while changing the character of the crest previously created in the thread rolling operation.

In all cases, the ribs extend away from the screw thread flank a distance somewhat greater than the normal clearance between the screw and the nut into which it is to be screwed so that part of the outer surface of the rib will come into contact with the corresponding flank of the thread of the nut. The rib, because of its particular configuration, has a degree of elasticity or flexibility so that when the screw is screwed into the nut or other internal thread, the rib bends back toward the flank of the screw to the extent required by the clearance. This produces a degree of friction between the screw and the nut that diminishes very slowly on repeated insertion and removal. Tests have shown that the frictional characteristics achieved by proper sized ribs cause screws so made to meet easily the installation and breakaway torque specifications set up by the Industrial Fasteners Institute. Repeated tests have shown that on the fifth removal, screws made according to the present invention have a much higher breakaway torque than the standards call for and the breakaway torque is still exceeded after as many as fifteen removals. The frictional effect is achieved without galling or gouging of the flanks of the internal thread.

The invention further contemplates that the ribs may be placed on the flank or flanks of the screw threads either to extend continuously around the thread, intermittently around the thread, on one side or the other or on both sides of the threads, or in any desired staggered relationship. In other words, the user may select any configuration of rib arrangement he prefers and the thread rolling dies can readily be shaped to achieve this result.

Further, the leading and trailing ends of the ribs may be tapered gradually back into the flanks, the tapering being automatically accomplished by the action of the dies.

The invention further contemplates a novel construction of the dies for producing self-locking screws according to the foregoing description. The dies are made according to conventional practices up to the point where they are ready for hardening. Then, through the use of a suitable tool or tools, the walls or flanks of the thread forming grooves of one of the dies (preferably the movable die) are deformed over a suitable number of threads, and for a proper length and at a particular longitudinal position in the die in a manner which will result in the flank or flanks of the thread of the screw being correspondingly deformed just prior to discharge of the screw from the dies. After the threads of the die have been deformed to produce the type of ribs required, the die is hardened and is then ready for use in a conventional thread rolling die machine.

As is apparent to those familiar with this art, it is essential that the deformed threads in the die be located near the rear end of one of the dies (preferably the movable die) so that once the ribs have been created in the thread of the screw, they will not be washed out by coming into engagement with the finishing portion of the thread grooves at the end of the other die. For ease in discussion, hereinafter it will be assumed that the movable die is the one with the deformed walls. When the self-locking ribs are extended no more than 180° about the threads of the screw, then no special attention need be given to the fixed die. When the ribs are to completely encircle the screw, then in a preferred construction the corresponding threads in the fixed die which would normally tend to wipe out the ribs formed in the threads by the movable die are cut away to provide a relief area at the end of the fixed die, thus precluding any modification of the self-locking ribs just formed by the movable die. It will be understood, however, that the leading end of the rib in the screw thread will engage the fixed die before discharge to taper the rib back into the flank.

BRIEF DESCRIPTION OF THE DRAWINGS

FIG. 1 is a side elevation, considerably enlarged, of one type of screw that may be made by conventional thread rolling dies. At the right hand end are shown a number of different arrangements the ribs may take. There are intermittent ribs on one flank only, intermittent ribs on two flanks, intermittent ribs staggered from one flank to be other, a continuous rib on one flank only, and continuous ribs on two flanks. The leading and trailing ends of the ribs are preferably tapered back into the screw thread flanks to provide for a non-galling contact with the flanks of the internal thread on both conditions of entry and backing out.

FIG. 2 is a greatly enlarged section of one thread taken on the line 2—2 of FIG. 1 showing the relationship of the ribs to the internal thread.

FIG. 2a is an enlarged fragmentary view of a portion of FIG. 2 showing in greater detail an approximation of the character of the engagement of the rib with the internal thread.

FIG. 3 is an enlarged section taken on the line 3—3 of FIG. 1.

FIG. 4 is an enlarged transverse section of two adjacent threads of the movable die of a pair of thread rolling dies taken on the line 4—4 of FIG. 5 showing the manner in which the threads are deformed. A tool capable of achieving such deformation is positioned thereabove.

FIGS. 5 and 6 represent a pair of cooperating thread rolling dies showing schematically the appearance of the grooved faces thereof and the location of the deformed grooved walls in the movable die, FIG. 5, and the relieved area in the fixed die, FIG. 6, which is necessary when the ribs are to extend for more than 180°.

FIG. 7 shows an enlarged perspective view of a few adjacent threads of a die illustrating a few different arrangements in which the threads may be deformed by the use of suitable tools according to the suggested procedure in FIG. 4.

FIGS. 8a, 8b and 8c show three sequential views of the rolling operation in which the ribs are generated to extend a full 360° about the threads. The fixed die is relieved at the end to prevent washing out of the ribs as they pass this area.

FIGS. 9a and 9b show two sequential views of the fixed and movable dies arranged to produce a rib extending 180° more or less about the threads.

FIGS. 10a and 10b show two sequential views in which the dies are arranged to create a rib of less than 180° in the screw thread.

FIG. 11 is an enlarged cross sectional view of two adjacent threads of rib forming die showing details of a construction that has been used to produce satisfactory ribs on the threads of a ¼ x 20 screw.

FIG. 12 is a perspective view of the discharge end of the fixed dies showing the relief of the ends of the threads which causes the ends of the ribs on the thread of the screw to be tapered back in against the flank.

FIG. 13 is an end view of FIG. 12.

FIG. 14 is a fragmentary perspective view of ribs of any length in two adjacent threads. The leading end of the rib has been faired back into the flank by the relieved threads at the end of the fixed die. The trailing end of the rib tapers back to the flank because of the decreasing rib producing effect of the movable die against the screw thread as the screw moves away from the die as permitted by the relieved threads at the end of the fixed die.

FIG. 19 is an enlarged plan view generally similar to the position of the dies and screw shown in FIG. 9b. This illustrates the progressive movement of the screw thread and rib thereon with respect to the relieved fixed die that fairs the leading end of the rib into the flank and the movement of the rib away from the movable die to eliminate gradually the rib thus to taper the trailing end of the rib into the flank.

FIG. 20 is a cross section taken on line 20—20 of FIG. 19.

FIG. 21 is a cross section taken on line 21—21 of FIG. 19.

FIG. 22 is a cross section taken on line 22—22 of FIG. 19.

FIG. 23 is a cross section taken on line 23—23 of FIG. 19.

FIG. 24 is a cross section taken on line 24—24 of FIG. 19.

FIG. 25 is a cross section taken on line 25—25 of FIG. 19.

FIG. 26b shows in cross section a thread of a screw having ribs produced by the die of FIG. 26a.

DESCRIPTION OF THE PREFERRED EMBODIMENT

Figure 15:
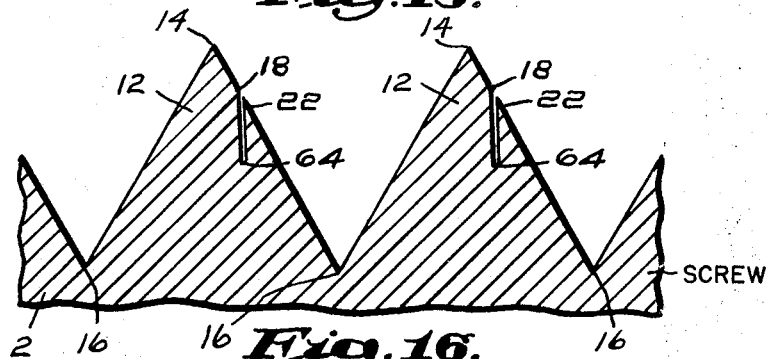
FIG. 15 is a section taken on the line 15—15 of FIG. 14.

Referring first to FIG. 1, it will be understood that the threaded screw therein indicated at 2 is representative of any type of screw capable of being made by conventional thread rolling dies. Such dies are indicated generally at 4 and 6 in FIGS. 5 and 6. The construction of these dies and the method of using them is well understood and details need not be shown herein. Suffice it to say that the shorter die 6 is held stationary in the machine, the longer die 4 is moved back and forth parallel to die 6, the round workpiece is introduced between the properly spaced dies, and as it rolls therebetween, the metal of the workpiece is progressively deformed by the teeth of the dies. When the movable die 4 has carried the rotating workpiece to the end of he fixed die, the threads of the screw will be fully formed and the completed screw will fall away.

According to the present invention, it is proposed that certain of the threads of the die 4 at a suitable location, as for example at the area 8, be deformed in the manner generally indicated in FIG. 4. The result of this die construction is that when the workpiece has reached a point between the dies where it is about to commence to roll through the deformed threads at the area 8, the screw threads themselves will have been fully formed and hence ready to take the deformation provided by the deformed walls of the threads in section 8 and as shown in cross section in FIG. 4.

Reference will now be made to FIGS. 1 to 4 and 7 to point out more particularly the nature of the deformation that is made in the flank or flanks of the thread of the screw to provide the self-locking characteristics.

Referring first to FIGS. 2 and 3, the crest of the screw thread 12 is indicated at 14, the root at 16, and the flanks at 18 and 20. The rib which acts as the self-locking means is indicated at 22 in flank 18 and at 24 in flank 20. The thread 12 has initially been formed by the thread rolling dies 4 and 6 in conventional manner. On reaching a certain part of the movable die near the discharge end thereof, the completed screw thread rolls along a portion of the die which in cross section has the configuration shown in FIG. 4 and produces ribs in the screw threads. These ribs 22 and 24 taper from a thin outer portion to a thicker base as at 26 and 28. The configuration of each rib is determined by the extent of the entry of the corresponding portion of the movable die into the screw thread flanks.

The dotted lines 30 and 32 in FIG. 2 represent the corresponding walls of the internal threads into which the screw is threaded. The distance 34 is representative of the clearance available according to standard design practice. Accordingly, it is essential that the ribs 22 and 24 extend away from the flanks of the thread a distance somewhat greater than the clearance 34 so as to bring a frictional force against the walls 30 and 32 when the screw 12 is in position within the internal threads. As the screw is forced therein, the ribs 22 and 24 come into engagement with the walls of the nut and are sprung inwardly to positions indicated at 22' and 24' which positions may or may not be within the elastic limits of the ribs 22 and 24. If the degree of bending of the rib when the screw is initially inserted in the nut exceeds the elastic limit, then upon removal of the nut the rib will spring away from the flank to assume an expanded position of less dimension than the original rib size. When the nut is reapplied to the screw, the bending of the rib will then be within the elastic limit. Subsequent removals and reapplications of the nut will not cause any further bending of the rib beyond its elastic limit at its new position and the locking capacity of the rib against the nut flank, diminished only by wear between the engaging surfaces, will be continuously maintained. When the nut is applied, the inner wall of the rib is placed in compression and the outer wall in tension.

The ribs 22 and 24 which extend continuously or intermittently over a selected number of turns of the screw thread provide a resistance to turning within the internal threads that meets the standards for both installation and breakaway torque. Since the displacement of the ribs to the positions at 22' and 24' against the walls of the internal threads is generally within the elastic limit of the rib structure, it follows that when the screw is removed, the ribs in spite of wear will more or less resume their original expanded positions. Thereafter, when the screw is reinserted, the ribs will reassume the dotted line position 22' and 24' shown in FIG. 2 to provide the required self-locking force.

It will be noted that there is no appreciable weakening of the threads of the screw at the self-locking portions so that the screw does not lose its effectiveness as a securing element. Thus, because of the springlike character of the ribs, the self-locking nature of the unit remains present through repeated insertions and removal from the internal threads as in a nut or other threaded aperture.

The ribs 22 and 24 may be continuous around the threads as suggested at 34 and 36 in FIG. 1. This arrangement gives maximum self-locking capacity. A continuous rib on one flank only is shown at 38. Intermittent ribs on one flank only are shown at 40. Staggered ribs on both flanks are shown at 42 and 44. Intermittent ribs, but oppositely disposed on the flanks, are shown at 46 and 48. Short ribs closely spaced are shown at 50 on one flank only; longer ribs widely spaced are shown at 52 on one flank only.

The foregoing enumerated arrangements are not to be considered in any way limiting as the ribs may assume any desired pattern according to the rib producing configurations that are made in the threads of the movable die.

Turning now to FIGS. 4 and 7, there is illustrated a greatly enlarged cross section of the movable die showing threads taken on the line 4—4 of FIG. 5. When the thread creating portions 54 and 56 of the die were originally formed, the flanks thereof were undistorted in the manner of a normal thread. Thereafter, at selected areas, and for selected distances along the flanks, a tool 58 of a length to produce the required length of rib is driven downwardly against the unhardened die flanks forcing part of the metal outwardly to create ribs 60 and 62. After all of the ribs of the selected character and length have been formed in the movable die (some varieties of which are shown in the perspective view in FIG. 7), the die is hardened. The die then becomes ready for use to create first the normal screw threads and then the ribs such as for example 22 and 24 shown in FIG. 2 when the screw reaches the area 8 of the movable die 4 and the screw threads are pressed against the ribs 60 and 62 of the die.

In FIG. 7, intermittent ribs are shown at 64; shorter intermittent ribs are shown at 66 and 67. The length of the ribs in the die flank is, of course, determined by the length of the tool 58.

In further explanation of the relationship of the die of FIG. 4 to the thread of FIG. 2, the leading edges of the ribs 60 and 62 of the die enter the flanks of the screw thread and form the base of the cavities in FIG. 2 as at 64 and 66 between the ribs 22 and 24 and the body of the thread 12. The ribs 22 and 24 are simultaneously created as the displaced metal of the screw thread 12 enters the cavities 67 and 70 of the die teeth.

It should also be noted that the self-locking feature of the screw as herein disclosed is effective with nuts or other internally threaded units having varying degrees of tolerances. The ribs 22 and 24 provide self-locking with a sloppy 2–b bit, or with a good 3–b fit. This is to say, the distance that the ribs 22 and 24 have been forced away from the body of the thread is sufficient to engage the wall or walls of loosely or close fitting nuts with sufficient frictional effect to meet the industry standards.

Attention is now called to FIGS. 8, 9 and 10 showing more particularly the location of the distorted walls or flanks on the movable die and the relative movement of the dies and screw threads while the ribs are being applied. While a continuous rib is shown in the movable die, it is to be understood that the rib in the die may be intermittent according to the manufacturer's preference. No limitation is to be placed on the length of the rib placed in the die for transfer to the thread of the screw.

In FIG. 8a the movable die is shown at 72 moving to the left. The selected thread grooves of the die have had ribs 80 formed over the length 74 at least equal to one full revolution of the screw 2. In FIG. 8b the movement of die 72 with respect to the fixed die 76 has caused the screw 2 to rotate 180° and has embossed on the screw thread the rib 78 which corresponds, for example, to rib 22 shown in FIG. 2. The rib 80 of the die has traveled a corresponding distance beyond the screw. In FIG. 8c the movable die 72 has traveled to the left an additional amount to cause the screw 2 to turn another 180° so that the rib 78 now extends around the thread for one full turn. In order to prevent the rib 78 from being washed out through engagement with the finishing thread grooves of the fixed die 76, the corresponding threads in the fixed die have been ground away to provide the relief area at 82. This relief area is also shown in FIG. 6.

In FIG. 9a, the movable die is shown at 84 and the fixed die at 86. The thread grooves of the fixed die 88 extend to the left hand end of the die in conventional fashion being relieved as at 90. The rib 92 of the movable die is shown ready to commence the development of the rib on the screw 2. In FIG. 9b, the movable die 84 has reached a point where the rib 92 has developed a corresponding rib 94 in the screw thread after 180° rotation of the latter, and at this point the screw 2 has reached the end of fixed die 86 and is ready to drop free. These illustrations are believed to make it clear that so long as the length of the die rib 92 is equal to or less than one half a circumference of the screw thread, and if the leading end of rib 92 is positioned the correct distance from the right hand end of the movable die 84, then the rib created in the screw thread will not thereafter engage any portion of the finishing threads of the fixed die, and accordingly will not be wiped out. It is, however, considered desirable for the leading end of rib 94 to engage the fixed die enough to give a good lead on the screw thread rib and full explanation of this feature will be made hereinafter.

FIG. 10 is illustrative of a construction generally similar to that shown in FIG. 9 but in which the rib 96 of the movable die 98 is of shortened length to produce a correspondingly short rib 100 on the screw 2. Again if the leading end of rib 96 is correctly placed with respect to the right hand end of movable die 98, the screw will reach the end of the fixed die 102 before the newly created rib can engage any part of the threads 104 of the fixed die.

FIG. 11, considered with FIG. 4, is useful in explaining in more detail the construction of the ribs in the movable die which have produced satisfactory self-locking ribs in a ¼" x 20 machine screw. The ribs in the die are preferably on the root side of the pitch line so that the resulting ribs on the screw thread will be well up toward the crest. A .012" deep cut into the die flank starting at about the pitch line produces a suitable sized rib. The dimensions given are representative but in no way limiting. Other dimensions for producing different sized ribs on the screw threads may, of course, be used.

FAIRING THE RIBS INTO THE SCREW THREAD FLANKS

In the discussion heretofore, principal emphasis was directed to the self-locking ribs per se. Tests have shown that when the ribs at their leading and trailing ends extend abruptly away from the flank, there is a tendency or even likelihood that the cooperating internal threads may be galled or gouged by the end of the rib which acts in the nature of a cutting tool. This gouging does not destroy the self-locking character of the screw as it is not sufficient to eliminate the frictional effect of the ribs against the internal threads. However, the insertion and breakaway forces are reduced on repeated insertions and removals of the screw.

Accordingly, it has been found desirable to create the ribs in such manner that the leading and trailing ends are faired or tapered back to positions substantially flush with the screw thread flanks. This result is achieved automatically by the dies just prior to discharge of the completed screw.

For clarity in further discussion, the front end of the rib as it is initially created by the movable die will be called the leading end and the other end of each rib the trailing end. When the screw is put to use, the trailing end of the rib being nearer the point of the screw will then become the leading end as it initially enters the internal threads of the receiving element.

The leading end of the rib is forced and tapered back into the thread flank by engagement with the ends of the threads of the fixed die just before discharge. The ends of the threads of the fixed die have been relieved in such manner that after the leading end of the rib has been forced back into the flank, the rib is caused to taper gradually outward from the flank to its full width position. This tapering is done automatically by the relieved threads of the fixed die just prior to the discharge of the completed screw.

The trailing end of the rib is tapered back into the flank by a totally different procedure which occurs automatically and substantially simultaneously with the tapering of the leading end.

As the self-locking rib is being created in the screw thread by the rib in the thread of the movable die, the screw is, of course, under full pressure as it rolls between the dies. The die rib thus penetrates the screw thread flank to full depth.

As the screw closely approaches the end of the fixed die, it moves into the relieved area of the fixed die threads which, as explained above, automatically taper the leading end of the rib back into the flank. As this occurs, the relief of the fixed die threads permits the axis of the screw to move slightly but progressively away from the face of the movable die. The result is that the depth of entry of the movable die rib into the flank of the screw thread is correspondingly decreased at a designed rate so that just as the screw drops free of the dies, the depth of entry of the die rib will be zero.

In this way, the leading and trailing ends of the rib are faired back into the screw thread flank, the leading end by having the dislodged metal forced back against the flank in tapered pattern, and the trailing end by progressive withdrawal of the die rib.

From the above explanation, it is obvious that the tapered ends of the ribs are not identical, but they are equally effective in preventing galling or gouging of the internal thread walls upon insertion (in which the trailing end becomes the leading end) and upon removal (in which the leading end is the leading end).

Reference is now made to FIGS. 12 to 25. FIGS. 12 and 13 illustrate the relieved ends of the threads in fixed die 6. (The special relieved area 82 shown in FIG. 6 is omitted in this case because the rib will not extend for 360°.) The die teeth 108 have crests 110 and roots 112 which are curved downwardly as at 114 and 116, respectively. Thus, as the leading ends of the screw thread ribs roll into the fixed die teeth 108, the ends initially engage the unrelieved die walls at the areas 118. These areas act to force the rib ends back flush with the screw flank. As screw rotation proceeds, the ribs 22 (see FIGS. 15, 16, 19, 20, 21, and 22) progressively engage the receding areas 120 and 121 of the relieved threads 108 to result in the tapered condition of the leading ends of the ribs as illustrated in FIG. 14.

Figure 16:
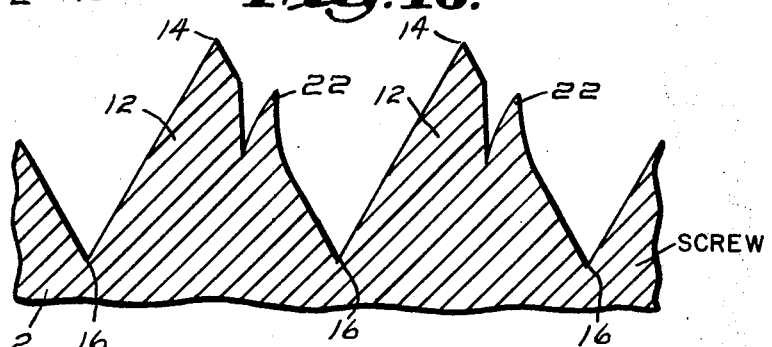
FIG. 16 is a section taken on the line 16—16 of FIG. 14.
Figure 17:
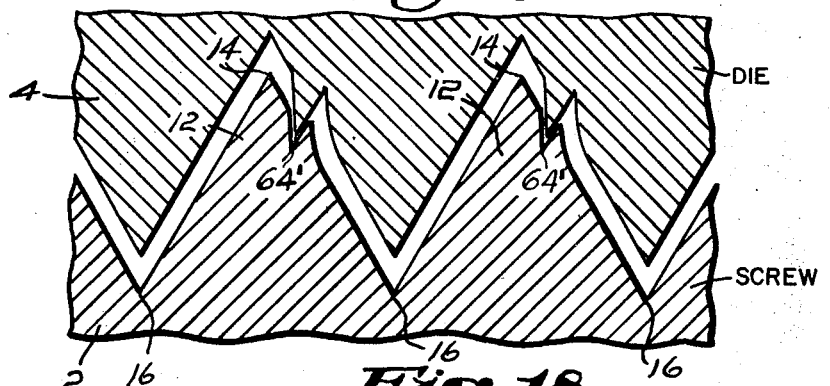
FIG. 17 is a section taken on the line 17—17 of FIG. 14 showing the movable die only partially in contact with the screw thread.
Figure 18:
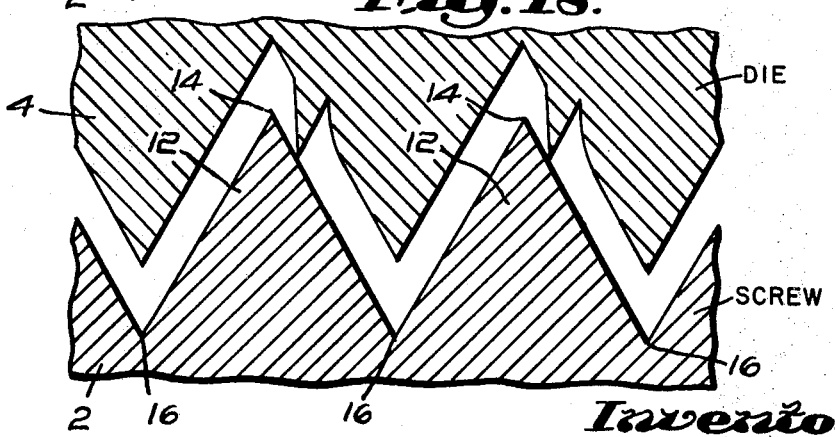
FIG. 18 is a section taken on the line 18—18 of FIG. 14 showing the movable die out of contact with the screw thread.

In further explanation of the above, in FIG. 14 the closed condition of the rib 22 at section line 15—15 as shown in FIGS. 15 and 20 is produced when the ribs 22 engage the unrelieved areas 118 of the die 6. As rotation of the screw continues, the rib 22 progressively opens, or putting it conversely, is progressively less closed as it engages the increasingly relieved areas 120 and 121 of die 6 to reach the fully open position indicated at section 16—16 in FIG. 14 and as shown in FIGS. 16, 21 and 22.

As further illustrated by FIG. 19, it is thought to be apparent that the axis of the screw 2 as it approaches the end of the fixed die 6 (or die 86 of FIG. 9, or die 102 of FIG. 10) will not hold to its normal course of parallelism with the faces of dies 4 and 6 but instead will fall away somewhat as indicated by the dotted line 122 in FIGS. 9b and 19.

The effect of this falling away is to decrease the depth of penetration of die rib 60 into the thread flank (see FIGS. 19, 23, 24 and 25). This results in the tapering of the trailing end of the rib 22 back into the flank 18 as illustrated at the right of FIG. 14 and by the sections shown in FIGS. 17, 18, 23, 24 and 25. The bottom 64 of the rib cavity is at a substantially constant depth at the leading end of the rib, but because of progressive withdrawal of the die rib 60 at the trailing end, the depth of the rib cavity decreases as at 64' in FIGS. 17 and 24 until it reaches zero depth as in FIGS. 18 and 25.

It will be understood that the length of the rib 22 shown in FIG. 14 is not to be considered as limiting in any way. It is representative of a rib of any angular length having a leading and a trailing end which regardless of the rib length may be faired back into the screw thread flank to produce a rib formation that will facilitate entry and removal of the self-locking screw into and out of a cooperating internal thread.

TEST RESULTS

A ¼" x 20 hardened set screw having ribs on four adjacent teeth, each rib being approximately ½" long and .012" deep was repeatedly screwed into and unscrewed from a ⅜" thick nut, soft and unplated and threaded by a GH 3 Tap.

The results were as follows:

| Insertion No. | Installation prevailing torque in inch-pounds | Removal No. | Breakaway prevailing torque in inch-pounds |
|---|---|---|---|
| 1 | 39 | 1 | 49 |
| 2 | 27 | 2 | 32 |
| 3 | 24 | 3 | 28 |
| 4 | 22 | 4 | 26 |
| 5 | 21 | 5 | 24 |
| 6 | 20 | 6 | 23 |
| 7 | 20 | 7 | 22 |
| 8 | 19 | 8 | 22 |
| 9 | 17 | 9 | 20 |
| 10 | 17 | 10 | 20 |
| 11 | 16 | 11 | 19 |
| 12 | 15 | 12 | 18 |
| 13 | 15 | 13 | 18 |
| 14 | 15½ | 14 | 18 |
| 15 | 14 | 15 | 16 |

In all of the above tests, it will be noted that the breakaway torque exceeded the installation torque. The standards of the Industrial Fastener Institute were fully met. The standard for ¼" screw calls for a first installation torque not greater than 40 inch-pounds, on the first removal of a breakaway torque of not less than 6.0 inch-pounds and on the fifth removal a breakaway torque of not less than 3.5 inch-pounds.

Note particularly that in the tests the breakaway torque on the 15th removal of 16 inch-pounds was far in excess of 6.0 inch-pounds standard for the first removal, to say nothing of the 3.5 inch-pounds minimum for the fifth removal.

Since the breakaway torque is the figure that determines the security of the screw in the nut or other internal thread, the test figures emphasize the unusual holding power achieved by the pressure of the ribs against the flanks of the corresponding internal threads.

It will also be apparent to those skilled in this art, that the number and size of ribs on the screw threads in relation to the clearance of the nut thread can be varied to control the degree of holding friction therebetween.

The modifications shown in FIGS. 26a to 29b inclusive will now be referred to. In all of these forms, the ribs have been positioned as close to the crest of the screw thread as possible. This result is accomplished by deforming the flanks of the movable die at a position close to the root.

Figure 26A:
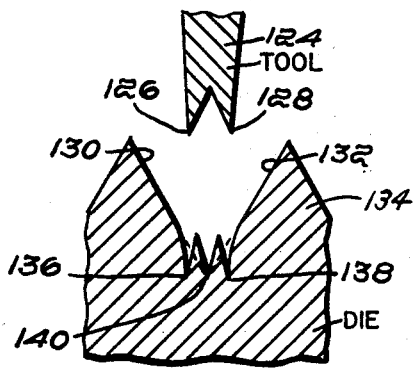
FIG. 26a shows in cross section a die construction in which the rib forming grooves are on a level with the root.

In FIG. 26a the tool 124 has been narrowed so that the cutting edges 126 and 128 enter the flanks 130 and 132 of the die 134 well below the pitch line so that the rib forming grooves created thereby extend downwardly to the positions 136 and 138 to be substantially on the same level as the root 140.

Figure 26B:
Figure 27B:
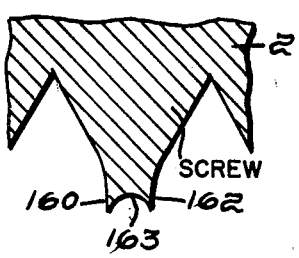
Figure 28B:
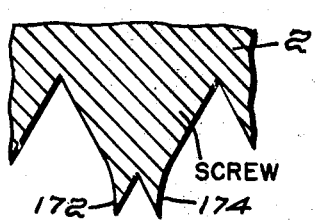

The rib formations made in die 134 as shown in FIG. 26a will produce ribs in the screw thread such as those shown in FIG. 26b. Here the ribs 142 and 144 are well out on the flanks 146 and 148 and have substantially the same radius over their length as the crest of the thread 150. Obviously, the length of the rib 142 about one turn of the thread will be somewhat greater than a rib located more inwardly along the flank 146. Thus the area of engagement of the rib 142 with the corresponding flank of the nut will be slightly greater. The ability to shift the location of the rib along the screw thread flank increases the various possibilities for control of the locking effect in varying situations.

Figure 27A:
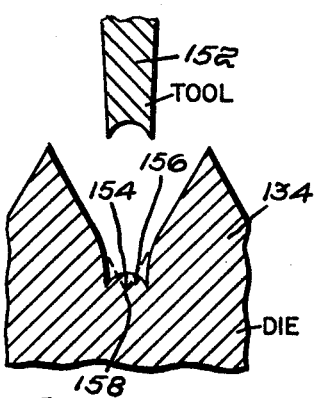
FIG. 27a and 27b show a further modification in the die and the ribs in the screw thread produced thereby. The conventional crest has been eliminated but the ribs remain.

In FIG. 27a the tool 152 has been designed differently at its cutting end. It is not only narrow, but the interior has been curved in a manner that will cause the two inner walls 154 and 156 that are created as the tool enters the die 134 to swing toward the center line and engage each other along a common wall 158. The die of FIG. 27a will produce the ribs shown in FIGS. 27b, 160 and 162, but the conventional thread crest will disappear as it is forced inwardly at 163 toward the body of the screw while the ribs are created. The ribs, however, function in exactly the same manner as the ribs shown in all of the other forms illustrated herein.

Figure 28A:
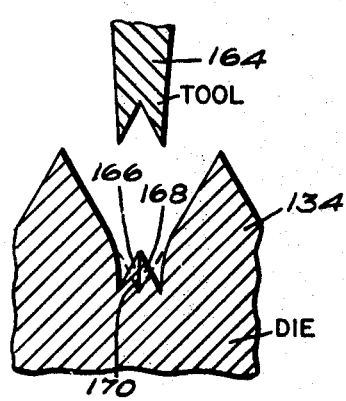
FIGS. 28a and 28b show another variation of die and the ribs in the screw thread with the conventional crest eliminated.

FIG. 28a shows another modification in which the tool 164 is shaped so that the inner walls 166 and 168 come together along a common surface 170. This type of die formation will create the thread shown in FIG. 28b in which the ribs 172 and 174 are longer and somewhat more flexible thn the ribs 160 and 162, for example, shown in FIG. 27b.

Figure 29A:
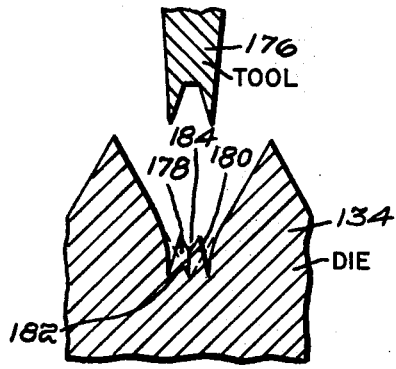
FIGS. 29a and 29b show still another variation of die and thread created thereby.
Figure 29B:
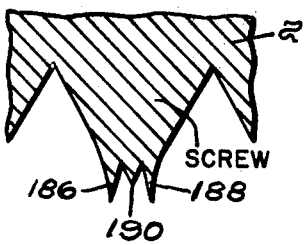

Another modification is shown in FIG. 29a in which the tool 176 will produce a die formation with the inner adjacent walls 178 and 180 meeting along the surface 182 for part of their length, leaving a V-shaped center notch 184. This die configuration will produce the thread formation shown in FIG. 29b. Here the ribs 186 and 188 are similar to all of the other ribs described heretofore as far as their effectiveness in locking the screw within the nut is concerned, but a crest 190 of slightly reduced diameter is created.

Figure 30:
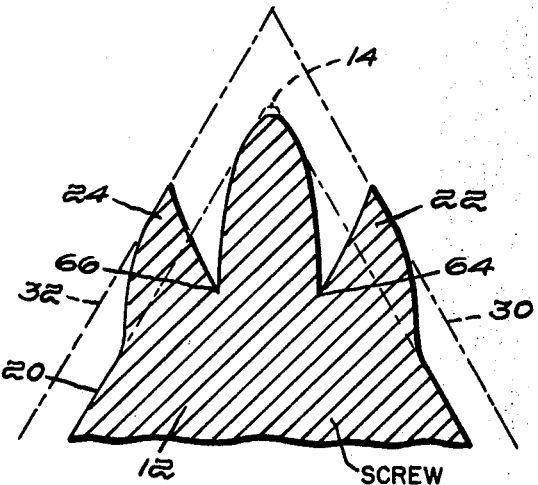
FIG. 30 is an enlarged fragmentary section of a screw thread showing the ribs near the crest and engaging the nut flanks close to the nut root.

The construction shown in FIG. 30 is included for the purpose of illustrating by comparison with FIGS. 2 and 2a that the invention is in no way limited to a particular rib configuration either in cross section or location along the flank of the screw thread.

From the foregoing explanation of the various forms the invention may take, it is apparent that the rib in all cases is formed by forcing outwardly a portion of the thread flank. The rib may be described generally as being someplace between the root and the crest of the thread. In the ordinary case, the crest of the thread will be of greater radius than the rib, but in some cases the crest may be of less radius as shown, for example, in FIGS. 27b, 28b and 29b. The inner wall of the rib necessarily must commence at a point within the thread flank, but the angularity of the inner and outer walls of the rib are in no way limited as to their specific configuration. When it is stated in the claims that the walls of the rib extend transversely of the screw axis, it is intended to mean that if the two curved surfaces of the rib were extended inwardly, each such surface would intersect the screw axis at some point determined by the angularity of the outer and inner rib surfaces.

It is intended to cover all changes and modifications of the example of the invention herein chosen for purposes of the disclosure which do not constitute departures from the spirit and scope of the invention.

I claim:

1. A self-locking screw characterized in that at least a part of one pitch of the threads on the screw is formed in the following configuration: that intermediate the crest and root, at least one flank of said thread has been deformed to produce an arcuate rib of generally triangular cross-section paralleling the crest and diverging outwardly beyond the surface of said flank with the walls of said rib extending transversely of the screw axis, the said rib being formed from the material of said thread to define a complementary cavity of substantially corresponding shape and volume within said thread, and said rib having its inner wall commencing at a point inwardly of the flank, the said rib being yieldable to conform to the corresponding flank of a cooperating internal thread when the screw is assembled into the internal thread.

2. The self-locking screw set forth in claim 1 in which the leading end of said rib is tapered back into said flank thereby to prevent galling or gouging of the cooperating flank of the internal thread.

3. The self-locking screw set forth in claim 1 in which the trailing end of said rib is tapered back into said flank thereby to prevent galling or gouging of the cooperating flank of the internal thread.

4. The self-locking screw set forth in claim 1 in which the leading and trailing ends of said rib are tapered back into said flank thereby to prevent galling or gouging of the cooperating flank of the internal thread.

5. The self-locking screw set forth in claim 4 in which the depth of said rib decreases to zero at the trailing end.

6. A self-locking screw set forth in claim 1 in which the ribs are formed in both flanks of said thread.

7. A self-locking screw as set forth in claim 6 in which the ribs are formed only partly around the flank of each pitch and in the flanks of a plurality of adjacent threads.

8. A self-locking screw comprising a continuous thread thereon and in which the crest of the thread is undistorted, a wedge shaped rib extending outwardly and beyond at least one flank of said thread, the surfaces of the walls of said rib being generally transverse of the screw axis, said rib being integral with said thread and having an arcuate outer edge which is parallel to and of less diameter than said crest, and a wedge shaped cavity in said flank immediately adjacent and coextensive with said rib, the volume of that part of said rib that is outward of said flank being substantially equal to the volume of said cavity that is inward of said flank.

9. The self-locking screw set forth in claim 8 in which both ends of said rib are tapered back into said flank.

10. The self-locking screw set forth in claim 8 in which the said rib is discontinuous and is on one flank only of said thread.

11. The self-locking screw set forth in claim 8, said rib being on the flank of at least two consecutive turns of said screw.

12. The self-locking screw set forth in claim 8 in which there is a second similar rib which extends outwardly and beyond the other flank of said thread.

13. The self-locking screw set forth in claim 12 in which the said rib on each flank is discontinuous.

14. The self-locking screw set forth in claim 8 in which the said rib is in sections and at least the leading and trailing ends of the first and last sections are tapered back into said flank.

15. A self-locking screw as set forth in claim 1, in which the said rib is located at a radial distance along said screw thread flank such that the outer edge of said rib is of greater radius than the said crest.

16. A self-locking screw as set forth in claim 15 in which the said crest is located within the projected intersection of said screw thread flanks.

17. A self-locking screw as set forth in claim 1 in which the point of commencement of the inner wall of said rib inside said flank is at approximately the same radius as the said thread crest.

18. A self-locking screw characterized in that at least a part of at least one pitch of the threads on the screw is formed in the following configuration: that intermediate the crest and root at least one flank of the thread comprising one pitch has thereon an arcuate rib integral therewith and wedge shaped in cross-section extending outwardly beyond the face of said flank, the outer edge of said rib paralleling said thread crest, and the outer wall of said rib merging in the direction transverse of the screw axis with said flank, said rib being yieldable to conform to the corresponding flank of a cooperating internal thread when the screw is assembled into the internal thread, and a wedge shaped cavity in said flank immediately adjacent and coextensive with said rib, the volume of that part of said rib that is outward of said flank being substantially equal to the volume of said cavity that is inward of said flank.

19. A self-locking screw characterized in that at least a part of one pitch of the threads on the screw is formed in the following configuration: that intermediate the crest and root at least one flank of said thread has been deformed to produce an arcuate bendable outwardly diverging rib having two outwardly converging walls each of which extends transversely of the screw axis, the inner of said walls commencing inwardly of the said flank and extending outwardly beyond said flank, the outer of said walls commencing at the said flank at a position of less radius than said inner wall, the said rib being formed from the material of said thread to define a cavity entirely within the said flank and which is generally complementary of that part of said rib that is exterior of said flank, said cavity being between said thread crest and said inner wall, said rib being yieldable in the direction of said flank with the said inner wall being placed in compression and the outer wall in tension when said screw is screwed into a correctly sized cooperating internal thread.

20. A self-locking screw as set forth in claim 19 in which said inner and outer walls intersect to form an edge.

21. A self-locking screw is set forth in claim 19 in which the angle between the said inner and outer walls is less than 90°.

22. A self-locking screw as set forth in claim 19 in which said rib is generally triangular in cross-section.

23. A self-locking screw characterized in that at least a part of one pitch of the threads on the screw is formed in the following configuration: that intermediate the crest and root there is present in at least one flank of said thread an arcuate rib of generally triangular cross-section, the outer edge of said rib being substantially parallel to the said crest, said rib having an outer wall which diverges outwardly away from the said flank and terminates at said outer edge, said rib having an inner wall which intersects said outer wall at said outer edge with the included angle between said walls being less than 90°, said rib walls extending transversely of the screw axis, said inner wall and said flank defining a space therebetween which extends radially inward of said outer edge, said rib being of such dimensions and configuration that the outer part adjacent said outer edge is capable of deflection toward said flank surface when screwed into a nut of a size normally adapted for use with a screw of this size without said rib with said outer wall being in tension and said inner wall being in compression.

24. A self-locking screw as set forth in claim 23, said inner wall commencing at a position within said flank thereby to define a cavity in the thread inside said flank which in cross-section is generally complementary of that part of the rib exterior of said flank, said cavity corresponding in volume with that part of the rib exterior of said flank.

25. A self-locking screw characterized in that at least a part of one pitch of the threads on the screw is formed in the following configuration: that intermediate the crest and root there is present in at least one flank of said thread an arcuate rib defined by an arcuate outer wall and an arcuate inner wall which walls intersect to form an arcuate outer edge exterior of said flank, said outer wall having an inner edge intersecting said flank along an arcuate line, said inner wall having an inner arcuate edge within said flank, said inner wall and said flank defining a space therebetween which extends radially inward of said outer edge, said outer edge, said inner edge of said outer wall and said inner edge of said inner wall all being concentric with said thread crest, said rib in radial cross-section being of generally triangular shape, the included angle between said outer and inner walls being such that the said outer edge and the adjacent outer part of said rib can bend toward said flank when engaged by the flank of a thread of a correspondingly sized nut with the outer wall in tension and the inner wall in compression, said rib being yieldable in the direction of said flank with the said inner wall being placed in compression and the outer wall in tension when said screw is screwed into a correctly sized cooperating internal thread.

References Cited

UNITED STATES PATENTS

| | | | |
|---|---|---|---|
| 2,301,181 | 11/1942 | Ilsemann | 151—22 |
| 3,124,188 | 3/1964 | Muenchinger | 151—22 |
| 3,186,464 | 6/1965 | Baumle | 151—22 |

RAMON S. BRITTS, Primary Examiner

U.S. Cl. X.R.

10—2, 10; 72—88